H. M. PFLAGER.
CAR TRUCK.
APPLICATION FILED JULY 6, 1917.
1,277,114.
Patented Aug. 27, 1918.
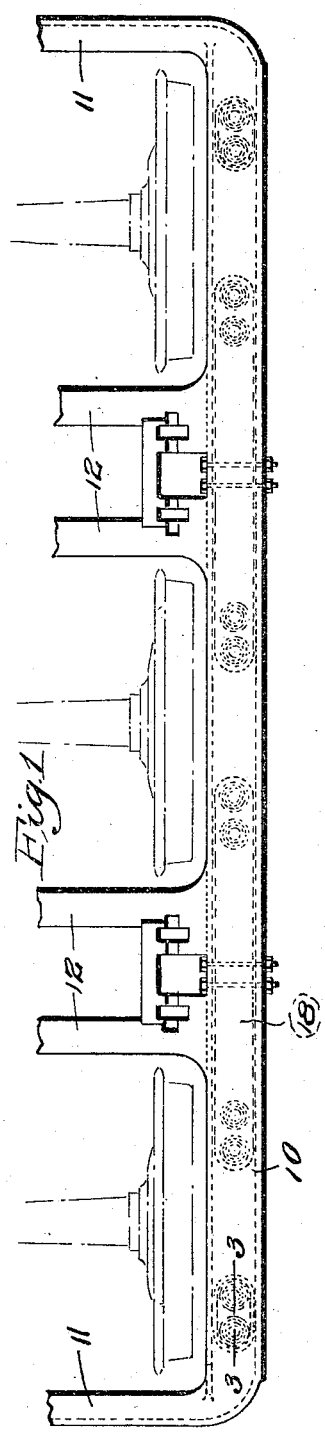
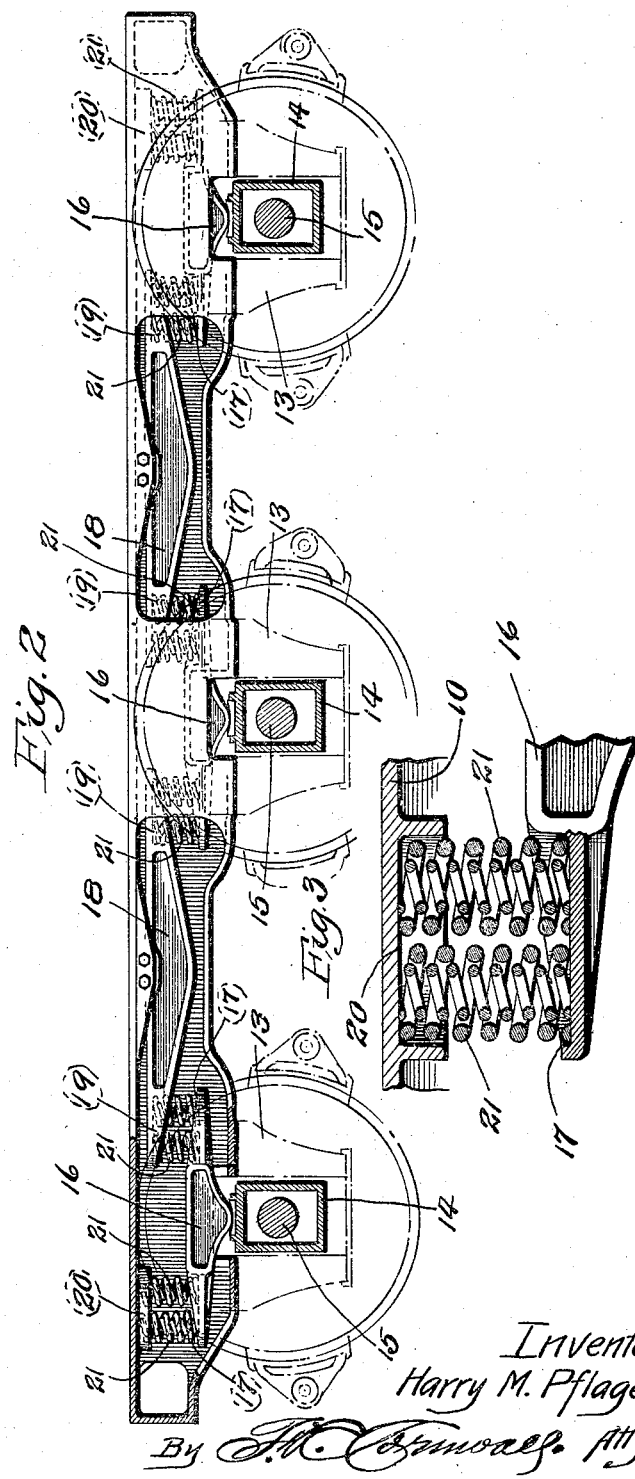
Inventor
Harry M. Pflager.

UNITED STATES PATENT OFFICE.

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

CAR-TRUCK.

1,277,114.

Specification of Letters Patent. Patented Aug. 27, 1918.

Application filed July 6, 1917. Serial No. 179,038.

*To all whom it may concern:*

Be it known that I, HARRY M. PFLAGER, a citizen of the United States, residing at St. Louis, Missouri, have invented a certain new and useful Improvement in Car-Trucks, of which the following is a full, clear, and exact description, such as will enable others skilled in the art to which it appertains to make and use the same, reference being had to the accompanying drawings, forming part of this specification.

My invention relates generally to railway car truck construction and more particularly to a new and improved spring equalizer arrangement for yieldingly supporting the truck frame upon the journal boxes, which latter it will be understood contain the bearings for the wheel carrying axles, and this application should be read and considered in connection with Patents Numbers 1,080,555, 1,080,556, 1,080,557, 1,080,558 and 1,080,559, issued to the assignee of Clarence H. Howard and myself December 9, 1913.

The principal objects of my invention are, to provide increased flexibility of the truck and equalize the distribution of weight upon all of the truck wheels; to provide a comparatively simple truck frame support which, by virtue of its arrangement and construction, will be effective in distributing and absorbing shocks and vibrations due to track irregularities and preventing said shocks and vibrations from being transmitted to the car body, thereby making the riding movement of said body more easy and gentle; and to dispose the flexible supporting means so that it will in nowise interfere with the free inspection, repair and adjustment of the brakes and brake rigging associated with the truck and the wheels thereof.

With the foregoing and other objects in view, my invention consists in a series of substantially rigid or non-elastic equalizing members supported by the journal boxes, a plurality of rigid or non-elastic equalizing members fulcrumed upon the truck frame, and springs, preferably of the helical type, arranged between the equalizing members and between certain of said members and the truck frame.

My invention further consists in certain novel features of construction and arrangement of parts, hereinafter more fully described and claimed, and illustrated in the accompanying drawings, in which—

Figure 1 is a plan view of the side portion of a truck frame, the same being equipped with the flexible support contemplated by my invention;

Fig. 2 is a side elevational view of the truck frame, parts thereof being broken away, and showing my improved supporting means associated therewith;

Fig. 3 is an enlarged sectional view taken approximately on the line 3—3 of Fig. 1.

Referring by numerals to the accompanying drawings, 10 designates the wheel piece of an accepted type of six wheel truck frame, the same being preferably of integral construction and including end pieces 11 and transom members 12.

Rigidly fixed to and depending from the wheel piece are pedestal jaws 13 between which are positioned the usual journal boxes 14, the latter containing the bearings for the ends of the wheel carrying axles 15.

The wheel pieces 10 of the truck frame are preferably hollow and of box-like construction in cross section with the bottom wall or plate cut away at points between the pedestal jaws for the accommodation of the journal boxes and the outer wall of said wheel piece being cut away at suitable points to permit the ready insertion or removal of the equalizer members and springs constituting my improved construction.

Balanced upon each journal box is a substantially rigid or non-elastic equalizing member 16, the ends thereof being provided with shallow pockets 17 adapted to receive the lower ends of helical springs. Fulcrumed on the wheel piece of the truck frame and preferably on the underside of the top plate thereof and at points approximately midway between the centers of the equalizing members 16 are equalizing members 18 in the underside of the end portions of which are formed spring pockets 19.

The spring pockets 19 in the ends of the equalizers 18 are disposed directly above the spring pockets formed in the ends of the equalizer which is mounted upon the central one of the journal boxes and above the spring pockets in the inner ends of the equalizers which are mounted on the outer or end pair of journal boxes.

Formed in the underside of the top plate of the wheel piece at points above the outer ends of the equalizers which are mounted on the outer pair of journal boxes are spring pockets 20. Interposed between the ends of the equalizing members 16 and 18 and between the outer ends of the pair of members which are mounted on the end pair of journal boxes and the top plate of the wheel piece are helical springs 21 of the compression type, that is, their normal tendency is to expand and resist compression. These springs are preferably arranged in pairs and if desired two or more springs of different sizes may be nested or arranged one within the other as illustrated in Fig. 3.

It will be understood that the ends of these springs occupy the various spring pockets 17, 19 and 20.

By my improved spring and equalizer arrangement a truck frame supporting structure is provided which is yielding and resilient to a comparatively high degree with the result that service shocks and vibration due to the passage of the truck wheels over rough tracks, switches, crossings and the like are practically absorbed and eliminated, and as a result the riding movement of the supported car body is rendered more easy and gentle.

The improved spring and equalizer arrangement is effective in materially increasing the flexibility of the truck and equalizing the distribution of the carried weight upon all of the truck wheels. Furthermore, by arranging the springs and equalizer members within the hollow wheel pieces of the truck, they are practically inclosed and consequently protected from injury, and further such arrangement leaves the brake beams, brake shoes, and brake rigging free for inspection and readily accessible in the event of repairs and adjustments.

It will be understood that the equalizing members 16 are free to rock vertically upon the journal boxes 14 and likewise that the equalizing members 18 can, under service conditions, rock upon their fulcrums, which latter may be of any desired form, preferably a pair of pins or bolts seated in the wheel piece and engaging in a pair of corresponding bearings which are formed in the top of the equalizer and spaced a short distance apart.

While I have illustrated and described my invention as being particularly applicable for six wheel trucks, it will be understood that practically the same arrangement can be advantageously utilized in connection with trucks having other wheel arrangements.

It will be readily understood that minor changes in the size, form and construction of the various parts of my improved car truck can be made and substituted for those herein shown and described, without departing from the spirit of my invention, the scope of which is set forth in the appended claim.

I claim:

The combination with a car truck frame and its journal boxes, said truck frame being provided with a substantially hollow wheel piece, the lower portion of which is cut away for the reception of the journal boxes, of rigid equalizing members bearing upon the journal boxes, rigid equalizing members bearing upon the truck frame at points between the journal boxes, coil springs arranged between the ends of the two sets of equalizing members, and coil springs arranged between the truck frame and the outer ends of the outer pair of equalizing members, all of which equalizing members and springs are disposed substantially within the wheel piece of the truck frame.

In testimony whereof I hereunto affix my signature this 26th day of June, 1917.

HARRY M. PFLAGER.